US010404485B2

(12) United States Patent
Han et al.

(10) Patent No.: US 10,404,485 B2
(45) Date of Patent: Sep. 3, 2019

(54) METHOD AND APPARATUS FOR RESTRICTING DISCLOSURE OF NETWORK INFORMATION DURING REMOTE ACCESS SERVICE

(75) Inventors: Se-Hee Han, Seoul (KR); Mahfuzur Rahman, San Jose, CA (US); Alan Messer, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 1239 days.

(21) Appl. No.: 12/716,765

(22) Filed: Mar. 3, 2010

(65) Prior Publication Data

US 2010/0228818 A1 Sep. 9, 2010

(30) Foreign Application Priority Data

Mar. 3, 2009 (KR) ........................ 10-2009-0018222
Mar. 3, 2010 (KR) ........................ 10-2010-0019145

(51) Int. Cl.
*H04L 12/28* (2006.01)
*H04L 29/06* (2006.01)
*H04L 29/08* (2006.01)

(52) U.S. Cl.
CPC ...... *H04L 12/2818* (2013.01); *H04L 12/2809* (2013.01); *H04L 29/08846* (2013.01);
(Continued)

(58) Field of Classification Search
CPC ............. H04L 2012/2849; H04L 67/16; H04L 12/2818; H04L 41/0809; H04L 12/2809; H04L 29/08846
(Continued)

(56) References Cited

U.S. PATENT DOCUMENTS 7,725,566 B2 * 5/2010 Stirbu ..................... H04L 67/16 709/220
7,852,860 B2 * 12/2010 Aizu .................. H04L 41/0226 370/252
(Continued)

FOREIGN PATENT DOCUMENTS

CN 101212464 7/2008
KR 1020080053262 6/2008
(Continued)

OTHER PUBLICATIONS

Nguyen, Bich et al., "RADAConfig:1 Service", for UPnP.TM. Version 1.0, Standardized DCP, Document Version: 1.0, Service Template Version: 2.00, Sep. 30, 2009, 20 pages. (Year: 2009).*

*Primary Examiner* — Gregory G Todd
(74) *Attorney, Agent, or Firm* — The Farrell Law Firm, P.C.

(57) ABSTRACT

A method and apparatus for restricting disclosure of information about a network device during a Remote Access (RA) service are provided, in which a virtual device is activated by an RA service device, a device or service for which information is to be disclosed to an external network is determined from among devices discovered by the RA service device and registered as an embedded device or service of the virtual device, a device description of the virtual device including the embedded device or service is dynamically generated, a Uniform Resource Locator (URL) of the RA service device, from which the device description of the virtual device is acquired, is generated and opened to a device of the other party which has remotely accessed the RA service device, and the device description of the virtual device is provided, upon receipt of a request for the device description of the virtual device through the URL.

17 Claims, 7 Drawing Sheets

(52) U.S. Cl.
CPC ............ *H04L 67/16* (2013.01); *H04L 12/281* (2013.01); *H04L 63/0236* (2013.01); *H04L 2012/2849* (2013.01)

(58) Field of Classification Search
USPC .................. 709/203, 222, 223, 244; 370/401
See application file for complete search history.

(56) References Cited

U.S. PATENT DOCUMENTS

| | | | | |
|---|---|---|---|---|
| 8,135,014 | B2 * | 3/2012 | Choi | 370/392 |
| 8,307,093 | B2 * | 11/2012 | Klemets et al. | 709/227 |
| 8,402,122 | B2 * | 3/2013 | Cho et al. | 709/222 |
| 2003/0169695 | A1 | 9/2003 | Salo et al. | |
| 2004/0193695 | A1 | 9/2004 | Salo et al. | |
| 2004/0233904 | A1 * | 11/2004 | Saint-Hilaire | H04L 12/2805 370/389 |
| 2005/0132366 | A1 * | 6/2005 | Weast | H04L 12/2803 718/1 |
| 2007/0061460 | A1 | 3/2007 | Khan et al. | |
| 2007/0162165 | A1 * | 7/2007 | Stirbu et al. | 700/65 |
| 2007/0233845 | A1 * | 10/2007 | Song et al. | 709/223 |
| 2007/0244578 | A1 * | 10/2007 | Stirbu | 700/65 |
| 2008/0316941 | A1 * | 12/2008 | Jung et al. | 370/254 |
| 2009/0080453 | A1 * | 3/2009 | Stirbu | 370/433 |
| 2010/0228818 | A1 * | 9/2010 | Han et al. | 709/203 |
| 2011/0002341 | A1 * | 1/2011 | Damola et al. | 370/401 |

FOREIGN PATENT DOCUMENTS

| | | | |
|---|---|---|---|
| WO | WO 2007/063408 | 6/2007 | |
| WO | WO 2007/110754 | 10/2007 | |
| WO | WO 2008136719 A1 * | 11/2008 | H04L 12/2821 |

* cited by examiner

```
<?xml version="1.0'?>
<root xmlns='urn:schemas-upnp-org:device-1-0">
  <specVersion><major>1</major><minor>1</minor></specVersion>
  <device>
    <deviceType>urn:schemas-upnp-org:device:RAVirtualDevice:1</deviceType>
    <friendlyName>MyVirtualDevice</friendlyName>
    <manufacturer>Samsung</manufacturer>
    <manufacturerURL>www.sec.com</manufacturerURL>
    <modelDescription>RA Virtual Device</modelDescription>
    <modelName>SGW-P1</modelName>
    <modelNumber>P1_W11</modelNumber>
    <modelURL>www.sec.com/products/SGW-P1</modelURL>
    <serialNumber>sec_SGW_P1_W11_011000321</serialNumber>
    <UDN>uuid:23ddf-23398vww-efew21-3243jiop</UDN>
    <UPC>0901123</UPC>
    <serviceList>
      <service>
        <serviceType>urn:schemas-upnp-org:service:RAVDConfigService:1</serviceType>
        <serviceId>urn:upnp-org:serviceId:RA_VDC</serviceId>
        <SCPDURL>192.168.11.1/ra_vdc/scpd.xml</SCPDURL>                          ~202
        <controlURL>192.168.11.1/ra_vdc/ctrl</controlURL>
        <eventSubURL>192.168.11.1/ra_vdc/event/subscription</eventSubURL>
      </service>
  </serviceList>
  <deviceList>                                                                     201
      <device>
        <deviceType>urn:schemas-upnp-org:device:MediaServer:3</deviceType>
        <friendlyName>MyMediaServer</friendlyName>
        <manufacturer>Samsung</manufacturer>
        <manufacturerURL>www.sec.com</manufacturerURL>
        <modelDescription>UPnP Media Server</modelDescription>
        <modelName>BlackJack_4</modelName>
        <modelNumber>SPH-W5500</modelNumber>
        <modelURL>www.sec.com/products/SPH-W5500</modelURL>
        <serialNumber>sec_SPH_W5500_01400121</serialNumber>
        <UDN>uuid:1p22-23498qaw-e3443243jiop</UDN>
        <UPC>09d233</UPC>
        <serviceList>
          <service>
            <serviceType>urn:schemas-upnp-org:service:ContentDirectory:3</serviceType>
            <serviceId>urn:upnp-org:serviceId:ContentDirectory</serviceId>
            <SCPDURL>192.168.11.4/cds3/scpd.xml</SCPDURL>                          ~203
            <controlURL>192.168.11.4/cds3/ctrl</controlURL>
            <eventSubURL>192.168.11.4/cds3/event/subscription</eventSubURL>
          </service>
        </serviceList>
      </device>
    </deviceList>
    <presentationURL>192.168.11.1/ui_vd/default.html</presentationURL>
  </device>
</root>
```

FIG.2

```
<?xml version="1.0"?>
<root xmlns="urn:schemas-upnp-org:device-1-0" configId="configuration number">
  <device>
    <deviceType>urn:schemas-upnp-org:device:deviceType:v</deviceType>
    <serviceList>
      <service>
      <serviceType>urn:schemas-upnp-org:service:ContentDirectory:3</ serviceType>
      <serviceId>urn:upnp-org:serviceId:CDS</ serviceId>
      <SCPDURL>192.168.1.5/scpd/cds</ SCPDURL>                        ~ 501
      <controlURL>192.168.1.5/control/cds</ controlURL>
      <eventSubURL>192.168.1.5/eventing/cds</ eventSubURL>
    </service>
   </serviceList>
</device>
</root>
```

FIG.5

```
<?xml version="1.0"?>
<root xmlns="urn:schemas-upnp-org:device-1-0" configId="configuration number">
  <device>
    <deviceType>urn:schemas-upnp-org:device:deviceType:v</deviceType>
    <serviceList>
      <service>
        <serviceType>urn:schemas-upnp-org:serviceContentDirectory:3</serviceType>
        <serviceId>urn:upnp-org:serviceIdCDS</serviceId>
        <SCPDURL>scpd/cds</SCPDURL>
        <controlURL>control/cds</controlURL>
        <eventSubURL>eventing/cds</eventSubURL>
      </service>
      <service>
601     <serviceType>urn:schemas-upnp-org:serviceQoSDevice:3</serviceType>
        <serviceId>urn:upnp-org:serviceIdQD</serviceId>
        <SCPDURL>scpd/qos_device</SCPDURL>
        <controlURL>control/qos_device</controlURL>
        <eventSubURL>eventing/qos_device</eventSubURL>
      </service>
    </serviceList>
  </device>
</root>
```

FIG.6

METHOD AND APPARATUS FOR RESTRICTING DISCLOSURE OF NETWORK INFORMATION DURING REMOTE ACCESS SERVICE

PRIORITY

This application claims priority under 35 U.S.C. § 119(a) to Korean Patent Applications filed in the Korean Intellectual Property Office on Mar. 3, 2009 and on Mar. 3, 2010, which are assigned Serial Nos. 10-2009-0018222 and 10-2010-0019145, respectively, the contents of which are incorporated herein by reference.

BACKGROUND OF THE INVENTION

1. Field of the Invention

The present invention relates generally to a remote access service based on a home network middleware protocol, Universal Plug and Play (UPnP) and more particularly, to a filtering method and apparatus for restricting disclosure of information about one or more physical home network devices during the use of a remote access service.

2. Description of the Related Art

In general, a home network is configured as an Internet Protocol (IP)-based private network. The home network is intended to connect all electronic devices used in a household, such as Personal Computers (PCs), intelligent products, wireless devices, etc. as a network in a common virtual computing environment called middleware and control them.

Middleware enables communication among digital devices by connecting them in a peer-to-peer manner. Middleware proposed so far includes Home Audio and Video Interoperability (HAVI), UPnP, Java Intelligent Network Infrastructure (Jini), Home Wide Web (HWW), etc.

Since modern operating systems support Plug and Play (PnP), installation and setup of PC peripheral devices has been facilitated. UPnP extends Plug and Play to an entire network based on standard Internet technologies such as Transmission Control Protocol/Internet Protocol (TCP/IP), Hypertext Transfer Protocol (HTTP), and Extensible Markup Language (XML), so as to build a network, particularly a home network with various electronic home appliances, network printers, and network devices like Internet gateways.

A UPnP network includes a Controlled Device (CD) that is controlled in connection to an IP-based home network and a Control Point (CP) that controls the CD. In the UPnP network, the CD communicates with the CP in the following stages using the UPnP protocol stack architecture, which includes Internet protocols such as TCP/IP and HTTP, and technologies such as XML and a Simple Object Access Protocol (SOAP).

A first stage is addressing. The CP and the CD are given respective IP addresses. When joining a network, the CD receives its own IP address using the Dynamic Host Configuration Protocol (DHCP), or is assigned an IP address using automatic TCP/IP addressing in the absence of a DHCP server on the network.

The second stage is discovery. The CP discovers the CD or the CD announces its presence. The discovery stage is performed using the Simple Service Discovery Protocol (SSDP). If the CD is added to the network, the CD transmits an SSDP alive message to the network using IP multicast, and the CP receives the SSDP alive message and is thus aware of whether the CD is connected to the network. When a new CP joins a network, the CP multicasts an SSDP Multicast-search (M-search) message to the network. Upon receipt of the SSDP M-search message, CDs transmit M-search response messages including information about the CDs to the CP.

The third stage is description. The CP checks the contents of a description of the CD. The CP checks the response message received from the CD and, if necessary, may request the CD send a more detailed description about itself. In response to the request, the CD transmits its information in the form of an XML document.

The fourth stage is control. The CP operates a CD by controlling its functions. In order for the CP to control the CD, the CP transmits a message selecting the desired service based on the detailed description of the CD to the CD using SOAP. SOAP is a protocol written in XML over HTTP for the purpose of receiving and transmitting Remote Function calls (RFC).

The fifth stage is eventing. The CP learns of an event change of the CD by eventing. When the CP wants to receive an event message from the CD, the CP transmits an event subscription request to the CD. If the subscription is successful, the CD transmits an event message to the CP using the General Event Notification Architecture (GENA).

The sixth stage is presentation. The CP represents the state of the CD using HTML.

The UPnP CD may provide the CP with various services (functions) based on this UPnP basic control method (i.e. the UPnP device architecture). For example, the UPnP CP may control a UPnP CD to copy Audio/Video (A/V) contents stored in the UPnP CD to another UPnP CD according to the UPnP basic control method. If the UPnP CD is a gateway, the UPnP CP may change and set an IP address range, subnet addresses, gateway addresses, etc. for allocation to in-home devices by controlling the UPnP gateway CD. Also, the UPnP CP may provide Remote Access (RA) service that enables remote access to a UPnP home network.

A UPnP RA service device may allow a user to set whether information about a home network device should be disclosed through a manager User Interface (UI) (e.g., a management console, etc.) by providing a filtering method for controlling disclosure or non-disclosure of information about the home network devices.

SUMMARY OF THE INVENTION

An aspect of the present invention is to address at least the problems and/or disadvantages and to provide at least the advantages described below. Accordingly, an aspect of the present invention is to provide a filtering method and apparatus for restricting disclosure of information about one or more physical home network devices during a Remote Access (RA) service session based on a home network middleware protocol, such as Universal Plug and Play (UPnP).

In accordance with an aspect of the present invention, there is provided a method for restricting disclosure of information about a network device during an RA service session in which a virtual device is activated by an RA service device. In the method a device or service for which information is to be disclosed to an external network is determined from among devices discovered by the RA service device and registered as an embedded device or service of the virtual device, a device description of the virtual device including the embedded device or service is dynamically generated, a Uniform Resource Locator (URL) of the RA service device, from which the device description of the virtual device is acquired, is generated and opened to a device of the other party which has remotely accessed the RA service device, and the device description of the virtual device is provided, upon receipt of a request for the device description of the virtual device through the URL. In accordance with another aspect of the present invention, there is provided an RA service device for restricting disclosure of information about a network device during an RA service session in which an RA server activates an RA virtual device, dynamically generates a device description of the virtual device including a registered embedded device or service, generates a URL of the RA service device, from which the device description of the virtual device is acquired, opens the URL to a device of the other party which has remotely accessed the RA service device, and provides the device description of the RA virtual device, upon receipt of a request for the device description of the virtual device through the URL. An RA discovery agent discovers Universal Plug and Play (UPnP) devices of a remote network, and the RA virtual device determines a device or service for which information is to be disclosed externally from among the discovered devices and registers the determined device or service as an embedded device or service.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 2 illustrates a device description of a UPnP Remote Access (RA) virtual device according to an embodiment of the present invention;

FIG. 5 illustrates a device description of a network device, which describes a service of the network device as an absolute path URL during a UPnP RA service session, according to an embodiment of the present invention;

FIG. 6 illustrates a device description of a network device, which describes a service of the network device as a relative path URL during a UPnP RA service session, according to an embodiment of the present invention.

Throughout the drawings, the same drawing reference numerals will be understood to refer to the same elements, features and structures.

DETAILED DESCRIPTION OF EMBODIMENTS OF THE INVENTION

Various embodiments of the present invention will be described in detail herein below with reference to the above-described drawings. The matters defined in the description such as a detailed construction and elements are provided to assist in a comprehensive understanding of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In a method for filtering network information, it is determined whether to restrict disclosure of information about a home network device to an external network by configuring a filter for the home network device, when a network image is synchronized between a Remote Access (RA) client and an RA server, or in case of home-to-home, between RA servers.

A filter configuration is defined using an Identifier (ID) of a network device to which a filter is applied, for example, a Universally Unique Identifier (UUID) of a local Remote Access Discovery Agent (RADA), an ID (e.g. UUID) of a home network device, and an ID of a remote network such as the ID of a credential used by a remote device.

In general, a management console discovers a home network device through a home network device discovery module, for example, a UPnP Control Point (CP) and collects information (i.e., a device description and a service description) about the home network device. Then, the management console configures a filter using an ID of the home network device included in the information about the home network device, for example, the UUID of the home network device. The management console may configure a filter for a synchronization device (e.g., an RADA) using a filter configuration service (e.g., RADAConfig) of an RA service device.

That is, a user may decide whether information about a particular home network device is to be open to an external network through a management User Interface (UI) such as a management console according to the general filter configuration method and filter definition.

Figure 1:
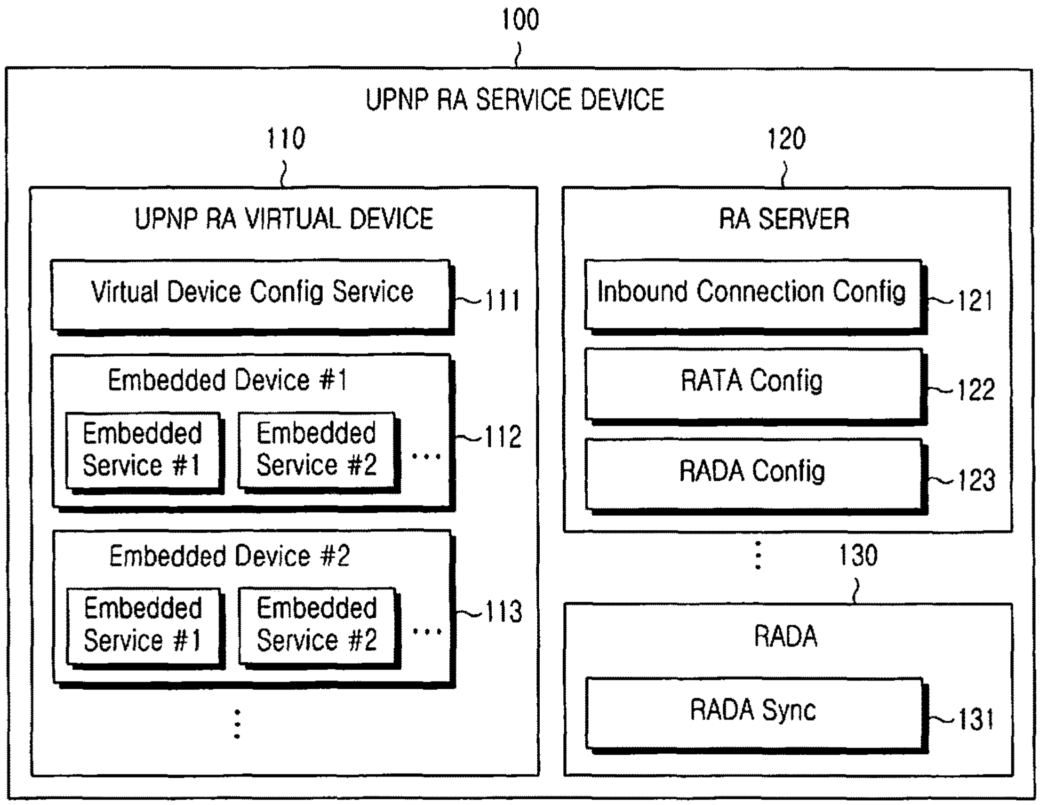
FIG. 1 is a block diagram of a Universal Plug and Play (UPnP) Remote Access (RA) service device according to an embodiment of the present invention.

FIG. 1 is a block diagram of a UPnP RA service device according to an embodiment of the present invention.

Referring to FIG. 1, a UPnP RA service device 100 according to the embodiment of the present invention includes an RA server 120, a RADA 130, and a UPnP RA virtual device 110.

The RA server 120 includes RA-associated services, specifically, Inbound Connection Config 121, a RATAConfig 122, and RADAConfig 123. The RADAConfig 123 provides an interface that activates or deactivates the UPnP RA virtual device 110. That is, the user determines whether to activate the UPnP RA virtual device 110 by controlling the RADAConfig 123 through the management console.

The RADA 130 includes an RA-associated UPnP service, RADASync 131. The RADA 130 synchronizes a list of UPnP devices that operate over a home network of the RA server 120 with a UPnP device list that an external RA client or server (not shown) has, through a RADASync CP (not shown) and the RADASync 131. The RADA 130 also processes Simple Service Discovery Protocol (SSDP) messages such that a UPnP CP (not shown) in the home network of the RADA 130 may discover a UPnP device in a remote network. Upon discovery of the UPnP device in the remote network, the UPnP CP transmits a control message to the discovered UPnP device in order to use a service provided by the UPnP device. This control message is delivered directly to the UPnP device of the remote network on a transport channel.

The UPnP RA virtual device 110 is a newly defined container device according to an embodiment of the present invention. Specifically, the UPnP RA virtual device 110 is a network device modified so as to include a service for which information is disclosed to an external network among devices in a network, or includes a network device or a service for which information is disclosed to an external network as an embedded device or service of the UPnP RA virtual device 110. The UPnP RA virtual device 110 includes a UPnP service called a UPnP RA Virtual Device Config Service 111 for configuring a container device. The UPnP RA virtual device 110 may register UPnP devices in a home network as embedded devices 112 and 113, each including a plurality of embedded services. That is, the UPnP RA virtual device 110 configures home network devices and services to be included in the UPnP RA virtual device 110 through the UPnP RA Virtual Device Config Service 111. The configured home network devices and services are dynamically registered as the embedded devices 112 and 113 and embedded services of the UPnP RA virtual device 110.

The user may configure a filter for the RA service device 100 using an RA management console (not shown) to open the UPnP container device 110 to a remote network. In addition, when the UPnP RA virtual device 110 is activated by the use of an interface of the RA service device 100, a filter may be automatically configured so as to open the activated UPnP container device 110 to the outside.

In accordance with an embodiment of the present invention, to restrict disclosure of information about a network device during an RA service session, the RA service device 100 activates the UPnP RA virtual device 110, determines a device or service for which information is to be disclosed to an external network from among devices discovered by the UPnP RA service device 110, and registers the determined device or service as an embedded device 112 or 113 or an embedded service of the UPnP RA virtual device 110. Subsequently, a device description is dynamically created for the UPnP RA virtual device 110 including the embedded device or service and a URL of the RA service device 100 from which the device description of the UPnP RA virtual device 110 can be acquired is generated. The URL is open to a device of the other party (an RA server or an RA client) that has remotely accessed the RA service device 100. Upon receipt of a request for the device description through the URL, the device description of the UPnP RA virtual device 110 is provided.

In this case, a direct access to the device description of an embedded device registered in the RA virtual device 110 is blocked.

The activation of the RA virtual device 110 may be performed by the RA service device 100 or the UPnP RA virtual device 110 may be activated autonomously, simultaneously with configuring the UPnP RA virtual device 110. In addition, the activation of the UPnP RA virtual device 110 may be performed by the device of the other party that has remotely accessed the RA service device 100.

When a device description is dynamically created for a device for which information disclosure is to be restricted, services of the device, for which information disclosure is to be restricted are deleted from the device description, and a URL of the device description is changed.

The URL is changed by representing the URL as a path relative to an address from which the device description is acquired or translating the URL as an absolute path including a physical address of the UPnP RA virtual device 110.

Meanwhile, when the URL is open to the device of the other party that has remotely accessed the UPnP RA service device 100, the RA service device 100 receives an Advertisement message that the network multicasts, extracts information about a message transmitting device from the received message, and if the message transmitting device is a device for which information disclosure is to be restricted or a device including a service for which information disclosure is to be restricted, the RA service device 100 transmits the URL of the device description of the UPnP RA virtual device 110 to the remote network.

Also, when the URL is open to the device of the other party that has remotely accessed the RA service device 100, upon receipt of a device update message or a network detachment message (e.g., byebye) that the network multicasts, the RA service device 100 extracts information about a message transmitting device from the received message, and if the message transmitting device is a device for which information disclosure is to be restricted or a device including a service for which information disclosure is to be restricted, the RA service device 100 regenerates the device description of the UPnP RA virtual device 110 and transmits it to the remote network.

The user may set only partial services of a general UPnP device or the UPnP container device as disclosed or non-disclosed to an external network. The Virtual Device Config Service 111 provides an interface that allows UPnP devices discovered inside a home to be registered as the embedded devices 112 and 113 of the UPnP RA virtual device 110 (i.e., the UPnP container device) and the device descriptions of the embedded devices 112 and 113 should be dynamically updated.

For a general UPnP device with partial services set to be disclosed or non-disclosed to a remote network, the RA server 120 acquires a device description document of the general UPnP device, creates a version of the device description document from which items about the services set as non-disclosed are removed, generates a URL of the RA server 120 from which the version of the device description document is acquired, and notifies the other RA service, that has remotely accessed, of the URL. In this case, an AddRemoteDevices( ) action of the RADASync 131 may be used.

In the case of a UPnP container device, when embedded devices and embedded services to be added to the UPnP container device are chosen, the device description document of the UPnP container device is dynamically created and a URL of the RA server 120 from which the device description document may be acquired is generated. This URL is provided to the other RA service that has remotely accessed. In this case, the AddRemoteDevices( ) action of the RADASync 131 may be used.

The Virtual Device Config Service 111 may provide an additional specialized configuration interface according to other application services. For example, an embedded device of the container device provides an AV service, the embedded device may be configured to disclose only particular contents or folders.

Although ControlURL, SCPDURL, EventSubURL, presentationURL, and iconURL provided by the general UPnP device or an embedded device or service of the UPnP container device are written as paths relative to a URL from which a device description document is acquired, these URLs are translated into absolute path URLs using the actual address of the general UPnP device or the UPnP container device. For example, if the location URL of the device description document of a device is 192.168.1.2 and ControlURL in the device description document is a relative path URL, cds/control, the Control URL of the dynamically generated device description document is translated to an absolute path URL, 192.168.1.2/cds/control.

To ensure security, the URLs of embedded devices or services may be translated based on the URL of a device that hosts the virtual device. For this purpose, a Network Address Translation (NAT) module or an Application-Level gateway (ALG) module needs to be configured. The NAT or ALG module functions to translate the URL of a physical device to the URL of a virtual device or replace the URL of the physical device with the URL of the virtual device during dynamic creation of a UPnP device description, translates the URL of the virtual device in a message to the URL of the physical device, and sets the URL of the virtual device in the result value of the message.

FIG. 2 illustrates a device description of a UPnP RA virtual device according to an embodiment of the present invention.

In FIG. 2, the illustrated device description is a device description of a virtual device RAVirtualDevice:1, in the case where the virtual device RAVirtualDevice:1 provides a service RAVirtualConfigService:1 and a media server MediaServer:3 is embedded in the virtual device RAVirtualDevice:1 using an interface that the service RAVirtualConfigService:1 provides.

The embedded media server MediaServer:3 is described by a device description denoted by reference numeral 201. If another device is embedded in the virtual device RAVirtualDevice:1, a <device> and </device> tag may be added at the same level as the tag within the device description 201.

As noted, the selected areas indicated by reference numerals 202 and 203, the URLs of the virtual device and the embedded device may be based on different IP addresses. However, to ensure more secure communication, an IP-based URL translated by a NAT may be used, rather than the IP address used by the physical device.

Figure 3:
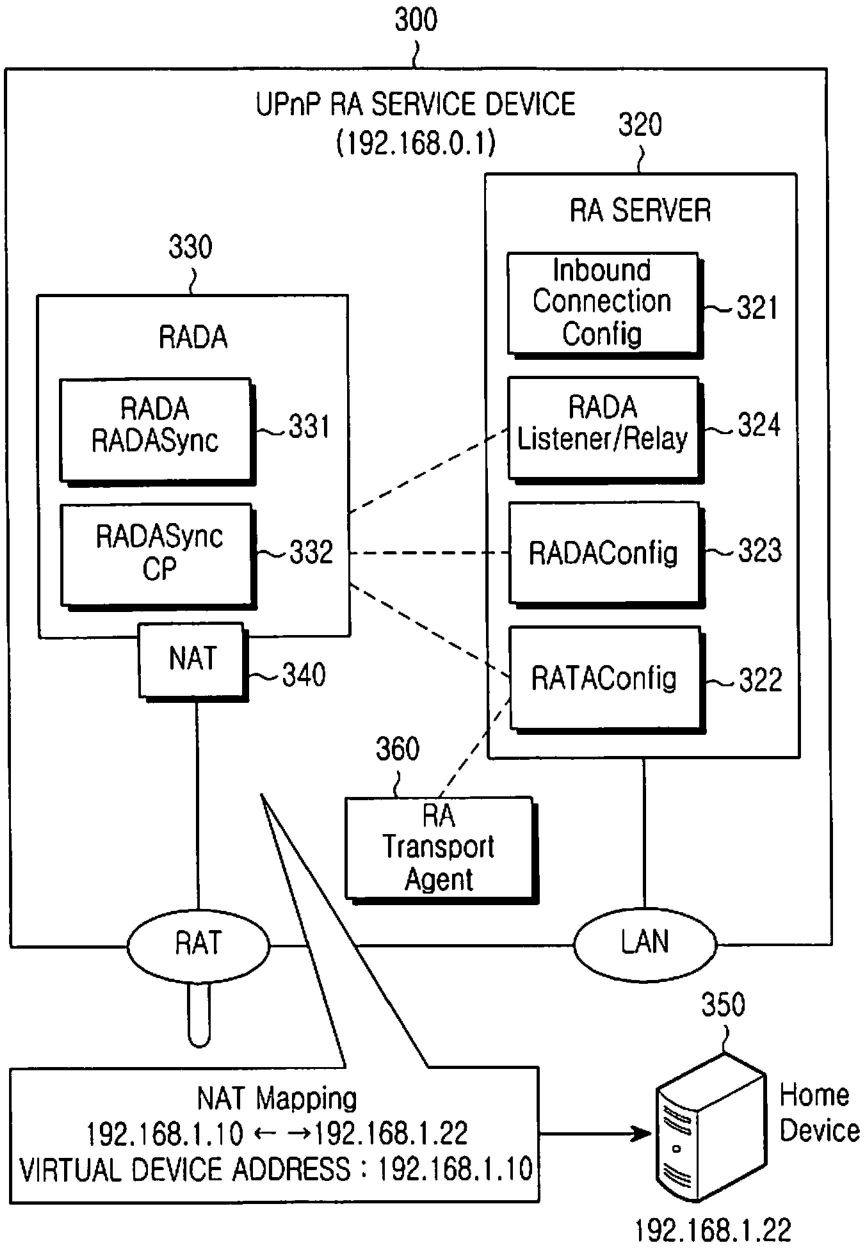
FIG. 3 is a block diagram of a UPnP RA service device including a Network Address Translation (NAT) for translating an Internet Protocol (IP) address of a network device during a UPnP RA service session according to an embodiment of the present invention.

FIG. 3 is a block diagram of a UPnP RA service device including a NAT for translating an IP address of a network device during a UPnP RA service session, according to an embodiment of the present invention.

Referring to FIG. 3, an RA service device 300 includes an RA server 320, a RADA 330, a Remote Access Transport Agent (RATA) 360, and a NAT 340. The RA service device 300 may further include a virtual device (not shown) for operating in the same manner as the UPnP RA virtual device 110 illustrated in FIG. 1. The RA service device 300 is connected to a home network device (not shown) and a management console (not shown) over a Local Area Network (LAN).

The RA server 320 includes RA-associated UPnP services, specifically Inbound Connection Config 321, RADA Listener/Relay 324, RADAConfig 323, and RATAConfig 322. The RADA 330 includes a support component, RADA Listener/Relay 331 and an RA-associated UPnP service, RADAConfig 332. The RATA 360 establishes RAT channels.

As illustrated in FIG. 3, the NAT 340 is provided in the UPnP RA service device 300 so that the IP address of a physical UPnP device 350, 192.168.1.22 is translated to a virtual device address, 192.168.1.10.

Figure 4:
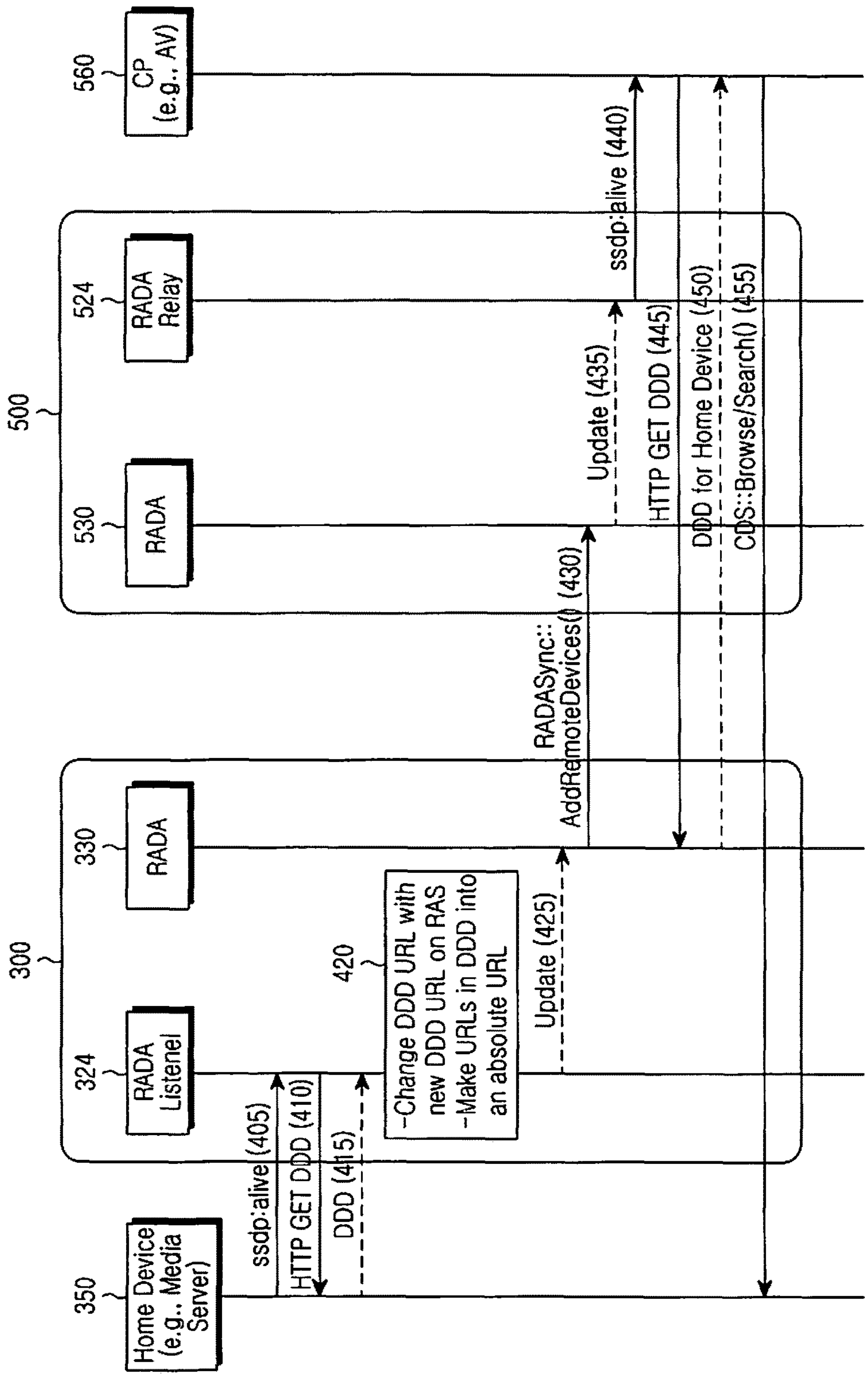
FIG. 4 is a diagram illustrating a signal flow for performing an RA service by changing an address of a network device during a UPnP RA service session according to an embodiment of the present invention.

FIG. 4 is a diagram illustrating a signal flow for performing an RA service by changing an address of a network device during a UPnP RA service session according to an embodiment of the present invention.

Referring to FIG. 4, the home network device 350 transmits an SSDP:alive message to a RADA listener 324 to discover a UPnP device in a network in step 405. In step 410, the RADA listener 324 transmits an HTTP GET DDD message to the home network device 350 in order to receive a device description document. The home network device 350 transmits the device description document to the RADA listener 324 in step 415.

In accordance with an embodiment of the present invention, the URL of the device description document is translated to a new URL in step 420. More specifically, the URL of the device description document may be translated to a URL including an absolute path to the physical device.

In step 425, the RADA listener 324 transmits an Update message for RA synchronization to the RADA 330. The RADA 330 transmits URL information to a RADA 530 of the other party using an action for notifying the other party of the URL of a device description document, i.e. AddRemoteDevices( ) in step 430. The RADA 530 transmits an Update message for RA synchronization to the RADA relay 524 in step 435 and the RADA relay 524 transmits an SSDP:alive message for UPnP discovery to a CP 560 that has performed an RA service in step 440. Then the CP 560 transmits an HTTP GET DDD message to the RA service device 300 to acquire the device description document of the home network device 350 that it will access remotely in step 445 and receives the device description document of the home network device 350 from the RA service device 300 in step 450. In step 455, the CP 560 performs an RA service with the home network device 350 through an action like Browse/Search( ) in step 455.

In accordance with the present invention, information disclosure or non-disclosure may be set for each service of a home network device and the address of the service may also be set as an absolute URL and a relative path URL. FIG. 5 illustrates a device description of a network device, which describes a service of the network device as an absolute path URL during a UPnP RA service session, according to an embodiment of the present invention, and FIG. 6 illustrates a device description of a network device, which describes a service of the network device as a relative path URL during a UPnP RA service session, according to an embodiment of the present invention. In FIG. 5, reference numeral 501 denotes an example of expressing the path of a service of a home network device as an absolute path, and in FIG. 6, reference numeral 601 denotes an example of expressing the path of a service of a home network device as a relative path.

Figure 7:
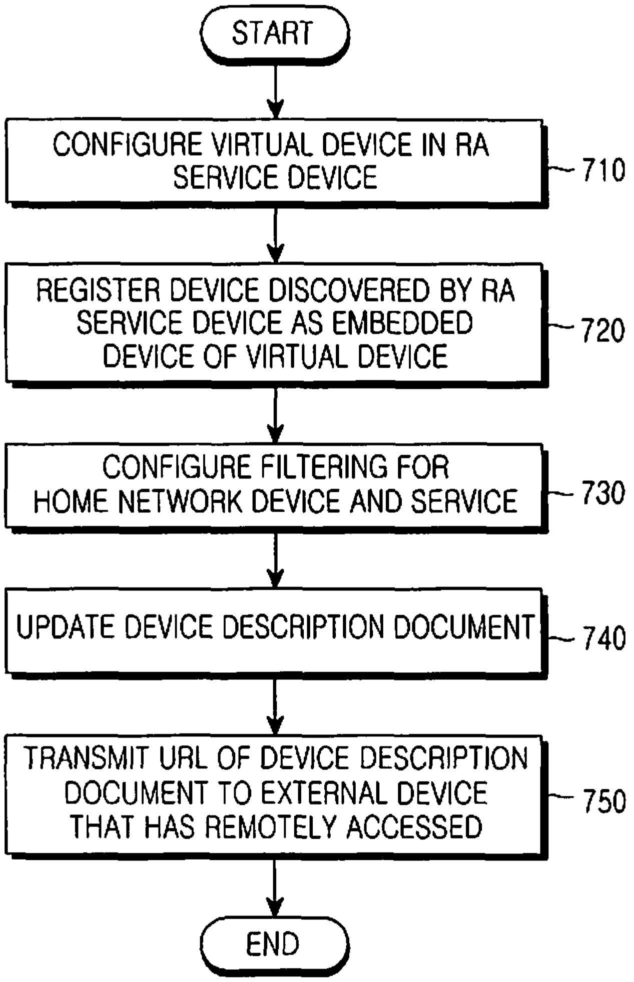
FIG. 7 is a flowchart illustrating an operation for restricting disclosure of network information during a UPnP RA service session, according to an embodiment of the present invention.

FIG. 7 is a flowchart illustrating an operation for restricting disclosure of network information during a UPnP RA service according to an embodiment of the present invention.

Referring to FIG. 7, in order to restrict disclosure of information about a home network device to an external network according to the present invention, aside from filter configuration for individual home network devices, a network device to be disclosed is registered as an embedded device in a virtual device and opened to an external network. The UPnP RA service device configures the internal UPnP RA virtual device in step 510. In step 520, the UPnP RA service device registers one or more physical devices to be open to an external network from among physical devices discovered through the RADA, as RA virtual devices or embedded devices in the UPnP RA virtual device. The UPnP RA service device receives information from the user indicating whether to disclose or restrict disclosure of the embedded devices and services of the UPnP RA virtual device to an external network and configures filtering according to the received information in step 530. The UPnP RA service device acquires a device description document of an embedded device for which filtering is configured, creates a new device description document by eliminating services set as non-disclosed from the acquired device description document, and dynamically generates a URL of the RA server at which the new device description document is available in step 540. In step 550, the UPnP RA service device transmits the URL to the external network that has remotely accessed the RA service device. Then, the UPnP RA service device ends the procedure. By this operation, the UPnP RA service device restricts external disclosure of information about a home network device during an RA service session.

As is apparent from the above description, when a home network device is added to a network or disclosure or non-disclosure setting for an existing home network device is changed, disclosure or non-disclosure of information about the home network device may be changed without changing a filter for an RA service device in the present invention.

While, conventionally, a decision is made only as to whether information about a UPnP network device is to be disclosed, it may also be determined whether to disclose a UPnP service supported by the UPnP network device as well as whether to disclose the UPnP device in the present invention. Therefore, only a service of a home network device can be provided to a remote network without direct disclosure of the home network device, thereby enhancing operational security.

Since a user of a remote network can use a service through a virtual device without searching for a necessary home network device in a home network device list open to the remote network, an intuitive user interface can be provided, thus increasing usability.

While the present invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A method for restricting disclosure of information about a network device during a Remote Access (RA) service session in a home network, the method comprising:

activating, by an RA service device, a virtual device in the home network;

embedding, by the RA service device, devices discovered by the RA service device;

configuring, by the RA service device, a filter for determining whether to disclose or restrict disclosure of the embedded devices;

determining, by the RA service device, a device and service for which information is to be disclosed to an external network from among the embedded devices, based on the configured filter and registering the determined device and service as an embedded device and service of the virtual device;

dynamically generating, by the RA service device, a device description of the virtual device including the determined device and service;

changing, by the RA service device, a Uniform Resource Locator (URL) of the determined device and service in the generated device description into a URL of the virtual device;

opening, by the RA service device, the changed URL to a device of a party that has remotely accessed the RA service device;

receiving, by the RA service device, a request for the device description of the virtual device through the changed URL; and providing, by the RA service device, the device description of the virtual device, based on receiving the request.

2. The method of claim 1, further comprising blocking a direct access to a device description of the registered embedded device and service of the virtual device.

3. The method of claim 1, wherein the virtual device is autonomously activated when configuring the virtual device.

4. The method of claim 1, wherein the virtual device includes a network device modified to include a service for which information is to be disclosed externally among devices of a network, or includes a network device and service for which information is to be disclosed externally as the embedded device and service of the virtual device.

5. The method of claim 1, wherein the virtual device is a network device and service for which information is to be disclosed externally as the embedded device and service of the virtual device.

6. The method of claim 1, wherein changing the URL comprises representing the URL as a path relative to an address from which the device description is acquired.

7. The method of claim 1, wherein changing the URL comprises translating the URL as an absolute path including a physical address of the virtual device.

8. The method of claim 1, wherein opening the changed URL comprises:

receiving an advertisement message multicast over the home network;

extracting information about a transmitting device that transmitted the advertisement message from the received advertisement message; and transmitting the changed URL of the device description of the virtual device to a remote network, if the transmitting device is a device for which information disclosure is restricted or a device including a service for which information disclosure is restricted.

9. The method of claim 1, wherein opening the changed URL comprises:

receiving a device update message or a network detachment message multicast over the home network;

extracting information about a transmitting device that transmitted the device update message or the network detachment message from the received device update or network detachment message; and regenerating the device description of the virtual device and transmitting the regenerated device description to a remote network, if the transmitting device is a device for which information disclosure is restricted or a device including a service for which information disclosure is restricted.

10. The method of claim 1, wherein the RA service device uses UPnP (Universal Plug and Play).

11. A Remote Access (RA) service device for restricting disclosure of information about a network device during an RA service session in a home network, the RA service device comprising:

at least one processor; and a memory that stores instructions, which when executed, instruct the at least one processor to:

activate a virtual device in the home network, embed devices discovered by the RA service device, configure a filter for determining whether to disclose or restrict disclosure of the embedded virtual devices, determine a device and service for which information is to be disclosed to an external network from among the embedded devices, based on the configured filter and register the determined device and service as an embedded device and service of the virtual device, dynamically generate a device description of the virtual device including the determined device and service, change a Uniform Resource Locator (URL) of the determined device and service in the generated device description into a URL of the virtual device, open the changed URL to a device of a party that has remotely accessed the RA service device, receive a request for the device description of the virtual device through the changed URL, and provide the device description of the RA virtual device, based on receiving the request.

12. The RA service device of claim 11, wherein the at least one processor is further configured to provide an interface through which the virtual device is activated or deactivated.

13. The RA service device of claim 11, wherein the at least one processor is further configured to block a direct access to a device description of the registered embedded device and service of the RA virtual device.

14. The RA service device of claim 11, wherein the virtual device is autonomously activated when configuring the virtual device.

15. The RA service device of claim 11, wherein the virtual device comprises a network device modified to include a service for which information is to be disclosed externally among devices of a network, or comprises a network device and service for which information is to be disclosed externally as the embedded device and service of the virtual device.

16. The RA service device of claim 11, wherein the at least one processor is further configured to change the URL by representing the URL as a path relative to an address from which the device description is acquired.

17. The RA service device of claim 11, wherein the at least one processor is further configured to change the URL by translating the URL to an absolute path including a physical address of the virtual device.

* * * * *